United States Patent [19]

Uya et al.

[11] Patent Number: 4,601,007
[45] Date of Patent: Jul. 15, 1986

[54] FULL ADDER

[75] Inventors: Masaru Uya, Hirakata; Katsuyuki Kaneko, Osaka, both of Japan

[73] Assignee: Matsushita Electric Industrial Co., Ltd., Kadoma, Japan

[21] Appl. No.: 573,718

[22] Filed: Jan. 25, 1984

[30] Foreign Application Priority Data

Jan. 28, 1983 [JP] Japan ................... 58-13458

[51] Int. Cl.⁴ .............................. G06F 7/50
[52] U.S. Cl. ................................... 364/784
[58] Field of Search ......... 364/784, 785, 786

[56] References Cited

U.S. PATENT DOCUMENTS

| | | | |
|---|---|---|---|
| 4,071,905 | 1/1978 | Oguchi et al. | 364/784 |
| 4,422,157 | 12/1983 | Uhlenhoff | 364/786 |
| 4,449,197 | 5/1984 | Henry et al. | 364/784 |
| 4,471,454 | 9/1984 | Dearden et al. | 364/786 |
| 4,541,067 | 9/1985 | Whitaker | 364/784 |
| 4,547,863 | 10/1985 | Colardelle | 364/784 |

Primary Examiner—David H. Malzahn
Attorney, Agent, or Firm—Cushman, Darby & Cushman

[57] ABSTRACT

A full adder is constituted with complementary MOS FETs, wherein delay time of adding time and carry signal delay time are shortened as a result of reduced number of stages of signal processing gates.

5 Claims, 3 Drawing Figures

FULL ADDER

BACKGROUND OF THE INVENTION

1. Field of the Invention

The present invention relates to an improvement in semiconductor full adder.

2. Description of the Prior Art:

The conventional full adder has been constituted as shown in FIG. 1. This circuit receives a first input signal A and a second input signal B which are to be mutually summed and a carry input signal $C_i$, and outputs summed signal S and a carry output signal $C_o$. The circuit comprises NOR gates 1 and 2, AND.NOR complex gates 3 and 4 and NAND gates 5, 6 and 7. The above-mentioned gates are all constituted by known CMOS gates. Combination of the NOR gate 1 and the complex gate 3 and another combination of the NOR gate 2 and the complex gate 4 each has a function of exclusive OR gate (EXOR gate). Accordingly, the sum output signal S and carry output signal $C_o$ are represented as follows:

$$S = A \oplus B \oplus C_i \\ C_o = AB + C_i(A \oplus B) \quad (1)$$

The above-mentioned conventional full adder circuit has a problem that when the input signals A, B and $C_i$ are simultaneously input to the circuit, then the sum output signal S is obtained after propagation of the input signals through the gates 1, 3, 2 and 4, that is four stages of the logic gates, and accordingly, a process time becomes sum of delay times of the four gates. On the other hand, the output carry signal $C_o$ is issued by passing the input signal through the gates 1, 3, 6 and 7, that is, four stages of gates, accordingly it also requires a process time of a sum of delay times of the four gates. That is, the conventional full adder of FIG. 1 has a long processing time.

SUMMARY OF THE INVENTION

The present invention purposes to provide an improved full adder wherein processing time is drastically shortened, hence is suitable in constituting adders and multipliers of higher processing speed.

The full adder in accordance with the present invention comprises:

a first and a second logic gates which has a first, a second, a third, a fourth and a fifth input terminals, and an output terminal, and issues a lower logic level output signal at least either in a first state when all of said first, second and third input terminals are of higher logic level or in a second state when the first, fourth and fifth input terminals are of higher logic level, and issues a higher logic level output signal at least either in a third state when all of the first, second and third input terminals are of lower logic level or in a fourth case when all of the first, fourth and fifth input terminals are of lower logic level, and makes the output terminals high impedance state when the first and second logic gates are in other states than the above-mentioned four states, a third logic gate which has a sixth and a seventh input terminals and an output terminal, and issues a lower logic level output signal in a fifth state when both the sixth and seventh input terminals are of higher logic level, and issues a higher logic level output signal in a sixth state when both the sixth and seventh input terminals are of lower logic level, and makes the output terminal a high impedance state when the input terminals are in other states than the above-mentioned fifth and sixth states, a fourth logic gate which has a eighth, a ninth and a tenth input terminals and an output terminal, and issues a lower logic level output signal at least either in a seventh state when both of the eighth and ninth input terminals are of higher logic level or in an eighth state when both of the eighth and tenth input terminals are of higher logic level, and issues a higher logic level output signal at least either in a ninth state when both of the eighth and ninth input terminals are of lower logic level or in a tenth state when both of the eighth and tenth input terminals are of lower logic level, and makes the output terminal high impedance state when the fourth logic gate is in other states than the above-mentioned seventh to tenth states, first signal input means for inputting a first input signal to the second input terminal of the first logic gate, the second input terminal of the second logic gate, the sixth input terminal of the third logic gate, the ninth input terminal of the fourth logic gate, inverted first signal input means for inputting an inverted signal of the first input signal to the fifth input terminal of the first logic gate, and to the fourth input terminal of the second logic gate, second signal input means for inputting a second input signal to the fourth input terminal of the first logic gate, the third input terminal of the second logic gate, the second input terminal of the third logic gate and the tenth input terminal of the fourth logic gate, inverted second signal input means for inputting an inverted signal of the second input signal to the third input terminal of the first logic gate, and to the fifth input terminal of the second logic gate, third signal input means for inputting a third input signal to the first input terminal of the second logic gate and the eighth input terminal of the fourth logic gate, inverted third signal input means for inputting an inversed signal of the third input signal to the first input terminal of the first logic gate, a first output inverter with its input terminal commonly connected to output terminals of the first and the second logic circuits and with its output terminal connected to the outside output terminal to issue summed output signal therethrough, and a second output inverter with its input terminal commonly connected to output terminals of the third and fourth logic circuit and with its output terminal to issue carry output signal therethrough.

In the above-mentioned full adder in accordance with the present invention, there are six signals to be input to the logic circuit, namely, the first input signal (A) to be added, the second input signal (B) to be added, the third signal ($C_i$) (Carry signal), the inverted first input signal $\overline{A}$ produced by passing the first input signal A through the inverted (6), the inverted second input signal $\overline{B}$ produced by passing the second input signal B through other inverter (7), and the inverted third input signal $\overline{C_i}$ produced by passing the third input signal ($C_i$) through other inverter (5). The output terminals (f, f') of the first logic gate (1) and the second logic gate (2) are commonly connected, and signals of the commonly connected point is inverted by other inverter (8) as a buffer to produce a sum output S; on the other hand, output terminals (k, k') of a third logic gate (3) and a fourth logic gate (4) are commonly connected, and signal of the common connected point is inverted by other inverter (9) to produce a carry output signal $C_o$.

The full adder in accordance with the present invention has a sufficient driving power and drastically shortened processing time.

DESCRIPTION OF THE PREFERRED EMBODIMENTS

Figure 2:
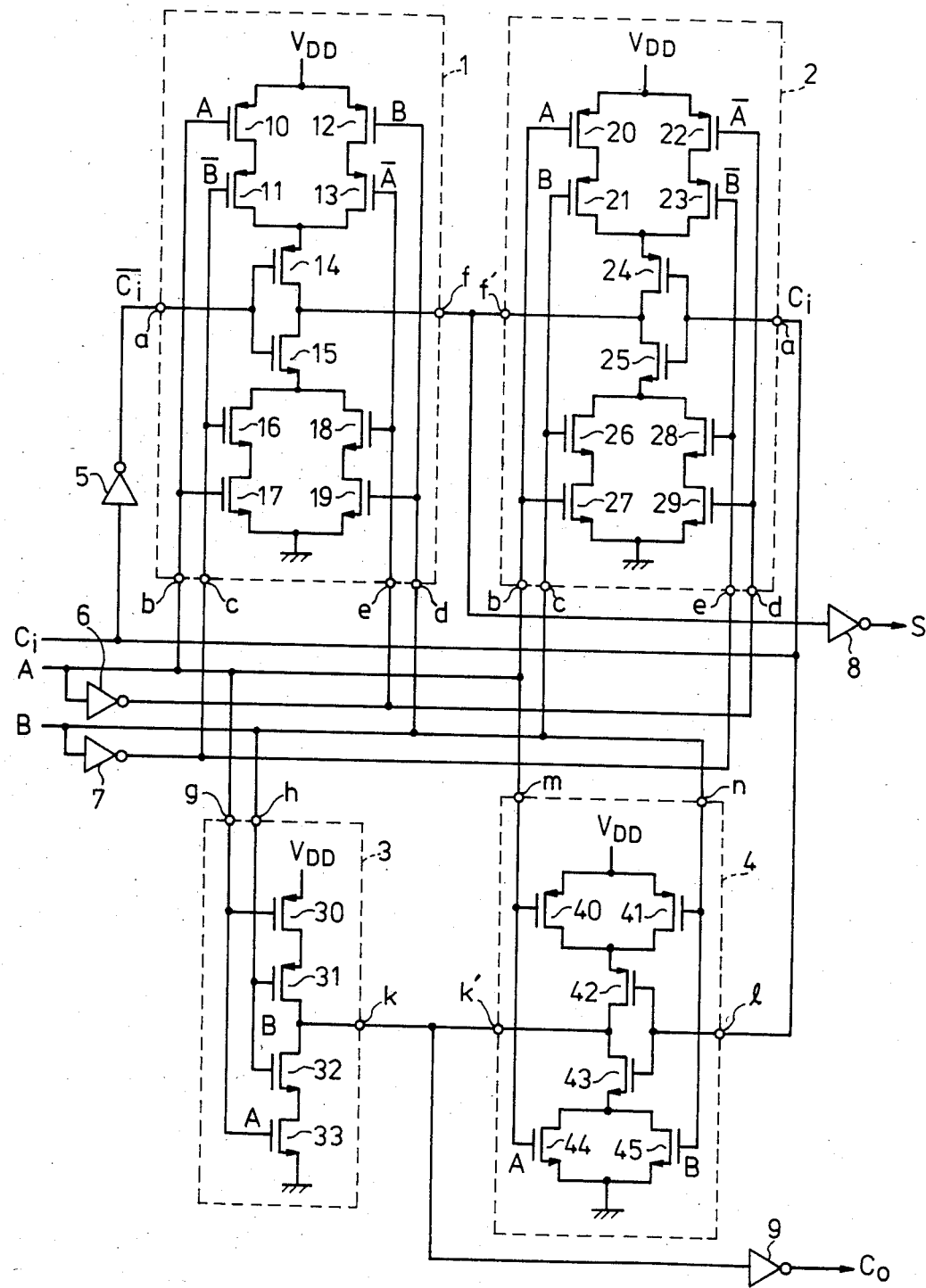
FIG. 2 is a circuit diagram of a full adder embodying the present invention.

FIG. 2 shows a preferred embodiment in accordance with the present invention. The full adder of FIG. 2 receives a first signal A and a second signal B which are added to each other and a carry input signal $C_i$, and produces sum output signal S and a carry output signal $C_o$, and constituted with CMOS transistors. The circuit comprises two logic gates 1, 2, which are substantially identically constituted with CMOS transistors and for functioning substantially identically, and a third logic gate 3 and a fourth logic gate 4 and further has five CMOS inverters 5, 6, 7, 8 and 9. Each of the logic gates 1 and 2 has five input terminals a, b, c, d and e and one output terminal f, and when the input terminals a, b and c are all of higher logic level, or all of the input terminal a, d and e are of higher logic level, the output terminal f issues a lower logic level output signal. On the other hand, when the input terminals a, b and c are all of lower logic level, or the input levels a, d and e are all of lower logic level, then the output terminal f issues a lower output signal 1. And at other states than the above-mentioned four states, the output terminal f is made a high impedance state. The logic gate 1 comprises ten CMOS transistors 10, 11, 12, 13, 14, 16, 17, 18 and 19. The CMOS transistors 10–14 and 20–24, 30, 31 and 40–42 are P channel CMOS transistors and CMOS transistors 15–19, 25–29, 32, 33 and 43–45 are N channel CMOS transistors. The second logic gate 2 is configurated identically to the first logic gate 1. The CMOS transistors 10 and 11 are connected in series forming a first series circuit and the CMOS transistors 12 and 13 are connected in series forming a second series connection, and the first series connection and the second series connection are connected in parallel forming a first parallel circuit. The CMOS transistors 16 and 17 are connected in series forming a third series circuit, and the CMOS transistors 18 and 19 are connected in series forming a fourth series connection and the third series connection and the fourth series connection are connected in parallel forming a second parallel circuit. The CMOS transistors 14 and 15 are connected in series forming a fifth series circuit. The first parallel circuit and the fifth series circuit and the second parallel circuit are connected in series between the positive power source terminal $V_{DD}$ and a negative power source terminal, i.e., ground. Gates of the CMOS transistors 14 and 15 are connected in common to the first input terminal a. And drains of the CMOS transistors 14 and 15 are connected in common to the output terminal f. The input terminals b, c, d and e are connected to the gates of the CMOS transistors 10&17, 11&16, 12&19 and 13&18, respectively. The logic gate 3 has two input terminals g and h and one output terminal k, and at the state when both the input terminals g and h are of higher logic level the output signal at the output terminal k becomes a lower level, and on the other hand, when the input terminals g and h are of lower logic level, the output signal 6 becomes a higher level, and in the states other than the above, the output terminal k is made a high impedance state.

The third logic circuit 3 has two p-channel CMOS transistors 30 & 31 and two N-channel CMOS transistors 32 & 33, all of them being connected in series across the positive power source terminal $V_{DD}$ and the negative power source terminal, ground. The gates of the first and the fourth CMOS transistors 30 and 33 are connected to the 6th input terminal g and the gates of the second and the third CMOS transistors 31 and 32 are connected to the 7th input terminal h. The junction point between the CMOS transistors 31 and 32 is connected to the output terminal k.

The fourth logic gate 4 has three input terminals l, m and n and one output terminal k', and when both the input terminals l and m are of higher logic level, or both the input terminals l and n are of higher input level, the output signal at the output terminal k becomes a lower logic level, and on the other hand when both the input terminals l and m are of lower logic level or both the input terminals l and n are of lower input level, the output signal becomes a higher logic level, and in states other than the above states, the output terminal k' becomes high impedance state. The fourth logic circuit 4 has three P-channel CMOS transistors 40, 41 & 42 and three N-channel CMOS transistors 43, 44 & 45. The CMOS transistors 40 and 41 form a third parallel connection, the CMOS transistors 44 & 45 form a fourth parallel connection and the CMOS transistors 42 & 43 form a second series connection. And the third parallel connection, the second series connection and the fourth parallel connection are connected in series across the positive power source terminal $V_{DD}$ and the negative power source terminal, the ground. Among the CMOS inverters 5–9, the CMOS inverters 8 and 9 have output buffer function.

The output terminals f, f' of the first and the second logic gates 1, 2 are connected in common to the input terminal of the output buffer inverter 8, output signal of which is issued as the sum output S. The output terminals k, k' of the third logic gate 3 and the fourth logic gate 4 are connected in common to the input terminal of the output buffer inverter 9, output signal of which is issued as the carry output signal $C_o$. Output of the logic gate 1, 2 with respect to the input signals A, B and $C_i$ and sum output signal S are shown in a truth table of Table 1, and output of the logic gates 3, 4 and carry output signal $C_o$ are shown in the truth table of Table 2. In the tables 0 indicates the lower logic level and 1 indicates the higher logic level.

TABLE 1

| A | B | $C_i$ | Logic gate 1 | Logic gate 2 | S |
|---|---|---|---|---|---|
| 0 | 0 | 0 | High | 1 | 0 |
| 0 | 0 | 1 | impedance | 0 | 1 |
| 1 | 1 | 0 |  | 1 | 0 |
| 1 | 1 | 1 |  | 0 | 1 |
| 0 | 1 | 0 | 0 | High | 1 |
| 0 | 1 | 1 | 1 | impedance | 0 |
| 1 | 0 | 0 | 0 |  | 1 |
| 1 | 0 | 1 | 1 |  | 0 |

TABLE 2

| A | B | $C_i$ | Logic gate 3 | Logic gate 4 | $C_o$ |
|---|---|---|---|---|---|
| 0 | 0 | 0 | 1 | 1 | 0 |
| 0 | 0 | 1 |   | High impedance | 0 |
| 1 | 1 | 0 | 0 |   | 1 |
| 1 | 1 | 1 |   | 0 | 1 |
| 0 | 1 | 0 | High impedance | 1 | 0 |
| 0 | 1 | 1 |   | 0 | 1 |
| 1 | 0 | 0 |   | 1 | 0 |
| 1 | 0 | 1 |   | 0 | 1 |

As an example, in a state when A=0, B=1 and $C_i$=0, the N channel CMOS transistors 15, 18 and 19 simultaneously are ON, thereby making the output of the logic gate 1 to be 0 and making the output terminal of logic gate 2 to be of high output impedance, thereby making the common connected output terminals 0, which is then inverted by the inverter 8 to produce output sum signal S of 1. On the other hand, at this time the P channel transistors 40 and 42 simultaneously are turned on, thereby making output signal of the logic gate 4 to be 1 and the output terminal of the logic gate 3 to the high impedance, thereby making the common connected output terminals k to be 1, which is inverted by the inverter 9 to produce the carry output signal $C_o$ of 0.

From the truth tables of Table 1 and Table 2, the sum output signal S and the carry output signal $C_o$ are represented in the following equations (2), which produce the same result as the equation (1) for the conventional full adder.

$$\left. \begin{array}{l} S = A \oplus B \oplus C_i \\ C_o = AB + BC_i + C_iA = AB + C_i(A \oplus B) \end{array} \right\} \quad (2)$$

Figure 1:
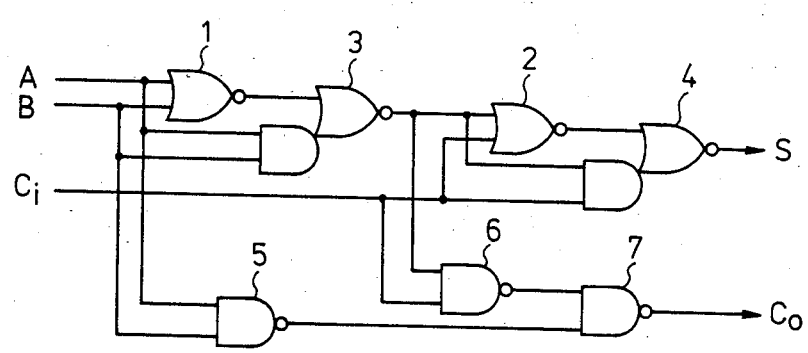
FIG. 1 is a circuit diagram of the conventional full adder circuit.

Nextly, summing processing time of the full adder of FIG. 2 is examined. Provided that the input signals A, B and $C_i$ are simultaneously input, in the inverters 5, 6 and 7 the output signals $\overline{A}$, $\overline{B}$ and $\overline{C_i}$ are simultaneously obtained, thereby making the six signals A, B, $C_i$, $\overline{A}$, $\overline{B}$ and $\overline{C_i}$ input to the logic gates 1, 2, 3 and 4 at the same time. Since the sum output signal S is buffered by the inverter 8, the sum output signal S is delayed for the sum of delay times for three gate circuits, namely two stages of inverters (6 or 7 and 8) and one stage of logic gate (1 or 2). Also, the carry output signal $C_o$ is delayed for a time of sum of two gate circuits, namely one stage of logic gate (3 or 4) and one stage of inverter 9. That is, the full adder in accordance with the present invention has a delay time of sum output signal S, which is about ¾ of the delay time of the conventional full adder of FIG. 1, and the carry output signal $C_o$ in accordance with the present invention is about ½ of the delay time of the conventional full adder of FIG. 1.

Figure 3:
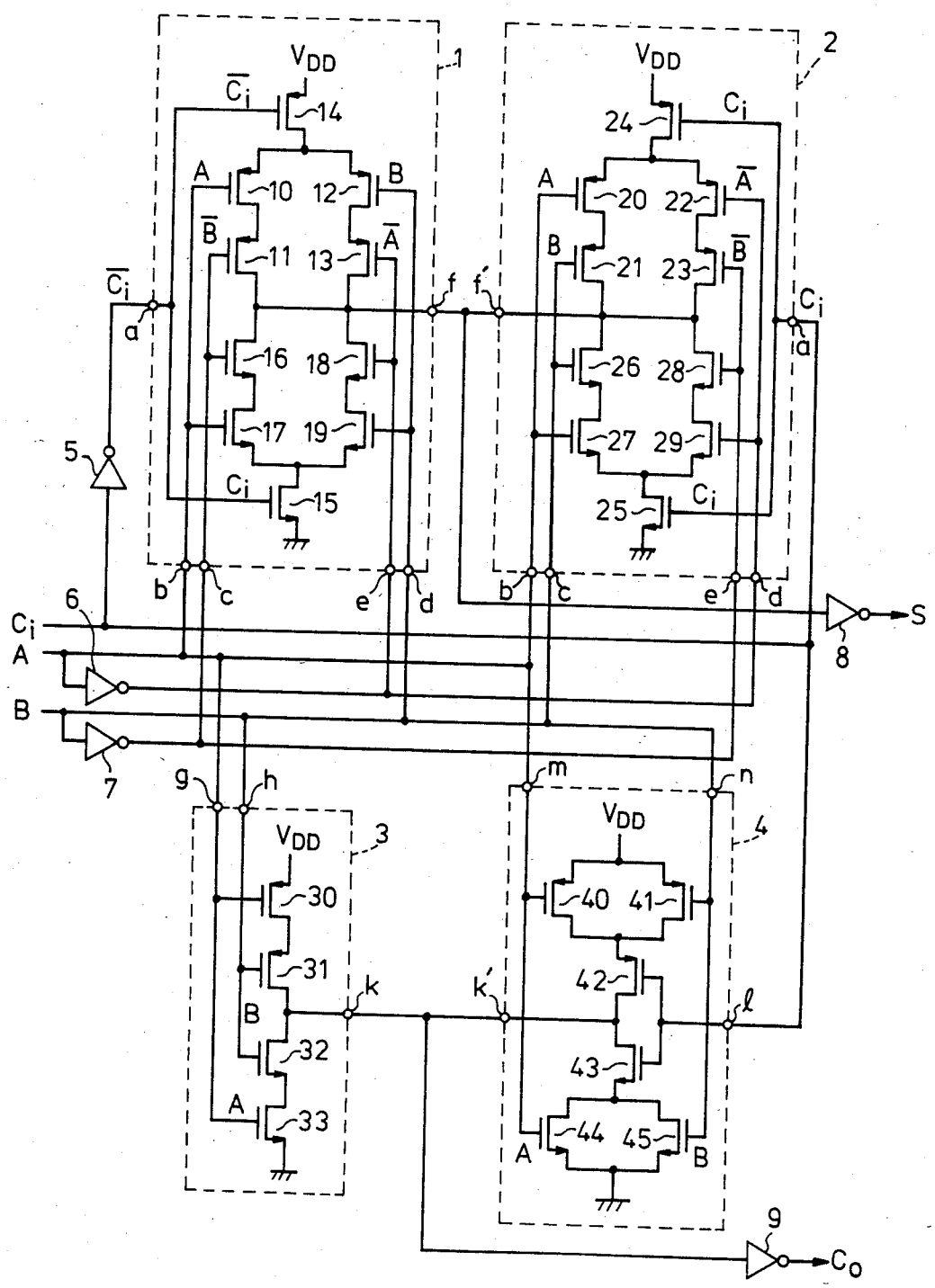
FIG. 3 is a circuit diagram of another full adder embodying the present invention.

The configuration of the logic gates 1, 2, 3 and 4 are not necessarily limited to the configuration of FIG. 2, but any circuit configuration can be utilized so far as the same functions are provided. For instance, in case the carry input signal $C_i$ is given at the timing prior to those of the input signals A and B in the logic gate 1, a higher speed operation is achievable by utilizing the circuit configuration of FIG. 3, wherein the first and the second logic circuits 1 and 2 are modified in a manner that the P channel transistor 14 and the N channel transistor 15 are disposed apart to the positive power terminal side and the negative power terminal side and the first and the third parallel circuits are directly connected each other with the output terminal f inbetween. By such configuration, load capacitances of the CMOS transistors 10, 17, 12, 19, 13, 18, 11 and 16 are reduced, thereby to shorten the time constants, hence delays of the operations of these CMOS transistors to which input signals, A, B, $\overline{A}$ and $\overline{B}$ arrive belatedly to the carry signal $C_i$. Thus the overall processing delay is shortened about twice.

As has been described in detail with respect to the embodiments, by reducing the number of stages of the logic circuits in comparison with the conventional full adder circuit, the processing speed, i.e., summing speed of the CMOS full adder in accordance with the present invention is 1.3–2 times higher with respect to the conventional full adder. Accordingly, the full adder in accordance with the present invention is suitable for constituting CMOS multiplier or multi-input adder or the like, and its industrial utility is very great.

What is claimed is:

1. A full adder comprising:
    a first and a second logic gates each of which has a first, a second, a third, a fourth and a fifth input terminals, and an output terminal, and issues a lower logic level output signal at least either in a first state when all of said first, second and third input terminals are of higher logic level or in a second state when said first, fourth and fifth input terminals are of higher logic level, and issues a higher logic level output signal at least either in a third state when all of said first, second and third input terminals are of lower logic level or in a fourth state when all of said first, fourth and fifth input terminals are of lower logic level, and makes said output terminal high impedance state when said first and second logic gates are in other states than the above-mentioned four states,
    a third logic gate which has a sixth and a seventh input terminals and an output terminal, and issues a lower logic level output signal in a fifth state when both the said sixth and seventh input terminals are of higher logic level, and issues a higher logic level output signal in a sixth state when both the said sixth and seventh input terminals are of lower logic level, and makes said output terminal a high impedance state when said input terminals are in other states than the above-mentioned fifth and sixth states,
    a fourth logic gate which has a eighth, a ninth and a tenth input terminals and an output terminal, and issues a lower logic level output signal at least either in a seventh state when both of said eighth and ninth input terminals are of higher logic level or in an eighth state when both of said eighth and tenth input terminals are of higher logic level, and issues a higher logic level output signal at least either in a ninth state when both of said eighth and ninth input terminals are of lower logic level or in a tenth state when both of said eighth and tenth input terminals are of lower logic level, and makes said output terminal high impedance state when said fourth logic gate is in other states than the above-mentioned seventh to tenth states,
    first signal input means for inputting a first input signal to said second input terminal of said first logic gate, said second input terminal of said second logic gate, said sixth input terminal of said third logic gate, said ninth input terminal of said fourth logic gate, inverted first signal input means for inputting an inverted signal of said first input signal to said fifth input terminal of said first logic gate, and to said fourth input terminal of said second logic gate, second signal input means for inputting a second input signal to said fourth input terminal of said first logic gate, said third input terminal of said second logic gate, said seventh input terminal of said third logic gate and said tenth input terminal of said fourth logic gate, inverted second signal input means for inputting an inverted signal of said second input signal to said third input terminal of said first logic gate, and to said fifth input terminal of said second logic gate, third signal input means for inputting a third input signal to said first input terminal of said second logic gate and said eighth input terminal of said fourth logic gate, inverted third signal input means for inputting an inverted signal of said third input signal to said first input terminal of said first logic gate, a first output inverter with its input terminal commonly connected to output terminals of said first and said second logic circuits and with its output terminal connected to the outside output terminal to issue summed output signal therethrough, and a second output inverter with its input terminal commonly connected to output terminals of said third and fourth logic circuits and with its output terminal to issue carry output signal therethrough.

2. A full adder in accordance with claim 1, wherein said third input signal is a carry input signal.

3. A full adder in accordance with claim 1, wherein each of said first and a second logic circuits comprises ten CMOS transistors, five of said CMOS transistors being CMOS transistors of a first conductivity type channel and other five CMOS transistors being CMOS transistors of a second conductivity type channel, two of said CMOS transistors being connected in series forming a first series circuit, another two of said CMOS transistors being connected in series forming a second series connection, said first series connection and said second series connection being connected in parallel forming a first parallel circuit, another two of said CMOS transistors being connected in series forming a third series circuit, another two of said CMOS transistors being connected in series forming a fourth series connection, said third series connection and said fourth series connection being connected in parallel forming a second parallel circuit, the last two of said CMOS transistors being connected in series forming a fifth series circuit, said first parallel circuit and said fifth series circuit and said second parallel circuit being connected in series between a positive power source terminal and a negative power source terminal, the gates of said fifth series circuit connected CMOS transistors being connected in common to said first input terminal, the drains of the same CMOS transistors being connected in common to said output terminal, said input terminals being connected to the gates of said CMOS transistors, respectively.

4. A full adder in accordance with claim 1, wherein said third logic circuit comprises two CMOS transistors of said first conductivity type channel and two CMOS transistors of said second conductivity type, all of them being connected in series across a positive power source terminal and a negative power source terminal, the gates of said first and said fourth CMOS transistors being connected to said sixth input terminal, the gates of said second and said third CMOS transistors being connected to said seventh input terminal, and said junction point between said CMOS transistors being connected to said output terminal.

5. A full adder in accordance with claim 1, wherein said fourth logic circuit comprises three CMOS transistors of said first conductivity type channel and three CMOS transistors of said second conductivity type channel, two of said CMOS transistors forming a third parallel connection, other two of said CMOS transistors forming a fourth parallel connection, other two of said CMOS transistors forming a second series connection, said third parallel connection, said second series connection and said fourth parallel connection being connected in series across a positive power source terminal and a negative power source terminal.

* * * * *